United States Patent [19]
Feger et al.

[11] 3,921,962
[45] Nov. 25, 1975

[54] SHAFT MOUNTING FOR CEMENT MIXER OR THE LIKE

[75] Inventors: Herbert Feger, Bruchhausen; Paul Hanns, Reichenbach, both of Germany

[73] Assignee: Elba Werk, Maschinen-Gesellschaft mbH & Co., Ettlingen, Germany

[22] Filed: Nov. 5, 1974

[21] Appl. No.: 521,097

[30] Foreign Application Priority Data
Nov. 10, 1973 Germany............................ 2356263

[52] U.S. Cl....... 259/178 R; 259/DIG. 16; 259/110; 277/92; 308/36.3; 308/107
[51] Int. Cl.².......................................... B28C 5/14
[58] Field of Search............. 259/DIG. 16, 109, 110, 259/9, 10, 178 R, 178 A, 179, 25, 26, 45, 46, 121, 122; 277/92; 308/36.1, 36.3, 107, 187

[56] References Cited
UNITED STATES PATENTS

| | | | |
|---|---|---|---|
| 2,948,554 | 8/1960 | Mahand............................ | 308/36.3 |
| 2,971,800 | 2/1961 | Ruthner............................ | 308/36.1 |
| 3,700,247 | 10/1972 | Butler............................ | 259/178 R |
| 3,752,489 | 8/1973 | Latinen............................ | 259/10 |
| 3,782,739 | 1/1974 | Kahanek............................ | 259/DIG. 16 |

*Primary Examiner*—Robert W. Jenkins
*Attorney, Agent, or Firm*—Ernest G. Montague; Karl F. Ross; Herbert Dubno

[57] ABSTRACT

A mounting for a horizontal shaft driving a stirrer of flowable material in a mixing chamber, such as a cantilevered arm in a cement-mixing drum, comprises a housing divided into two axially spaced compartments, i.e. a first compartment close to an apertured chamber wall traversed by the shaft and a second compartment remote therefrom. The first compartment contains a packing assembly on a supporting sleeve which fits closely onto the shaft for rotation therewith, this assembly including a rotatable section extending into the wall aperture and a nonrotatable section with interposed sealing in contact with each other; the second compartment contains a journal bearing for the free end of the shaft. The rotatable section is sandwiched between a flange of the sleeve and the nonrotatable section, the latter being axially slidable in a cylindrical housing portion but being held at a fixed axial distance from the rotatable section by a thrust bearing which rests against a shoulder on the sleeve.

10 Claims, 1 Drawing Figure

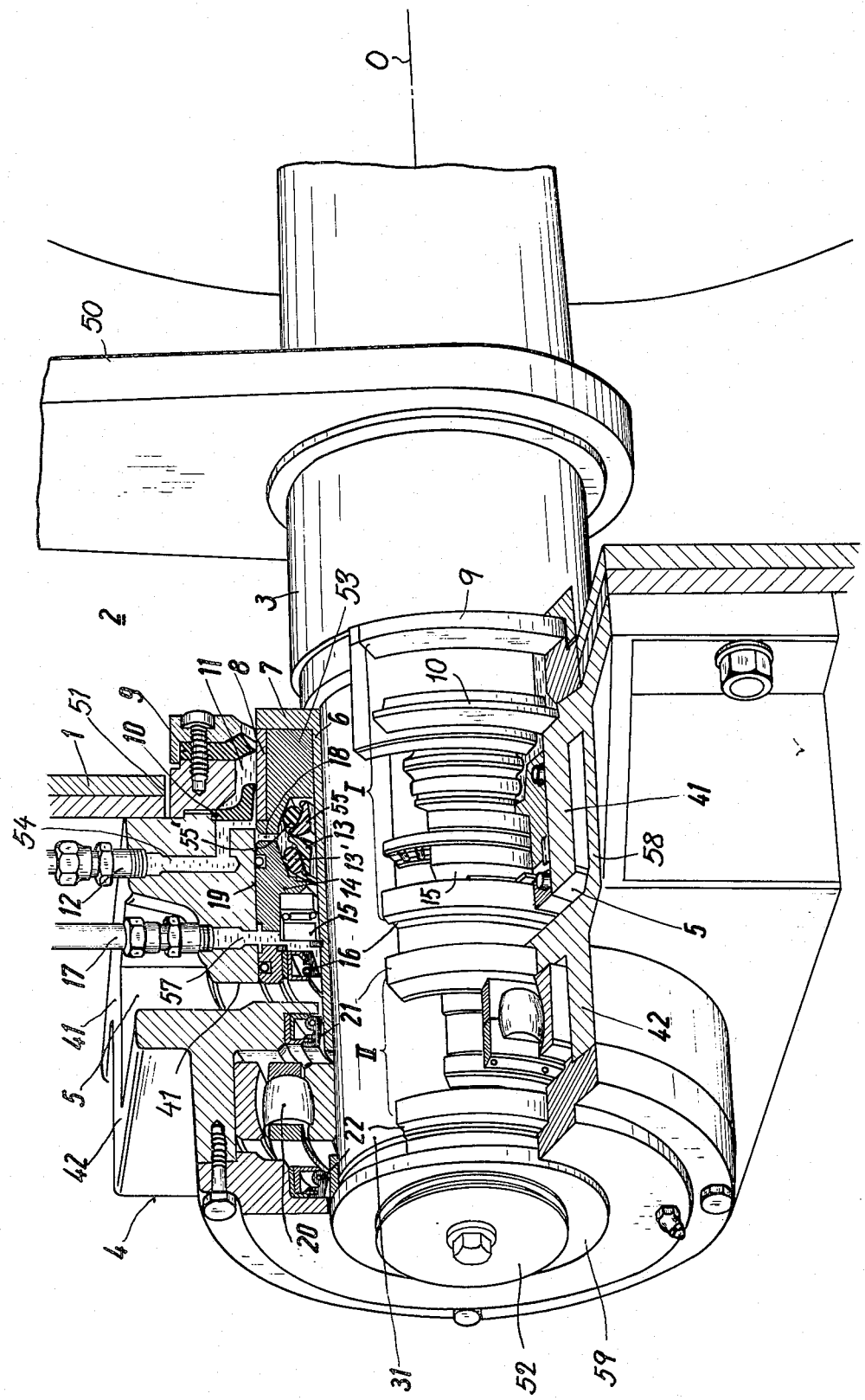

3,921,962

SHAFT MOUNTING FOR CEMENT MIXER OR THE LIKE

FIELD OF THE INVENTION

Our present invention relates to a mounting for a substantially horizontal shaft connected to a load in heavy-duty machinery, such as the drive shaft of a mixer for cement and other building materials.

BACKGROUND OF THE INVENTION

In our copending application Ser. No. 510,741, filed Sept. 30, 1974, we have disclosed an apparatus of this nature wherein a container has a pair of vertical end walls with apertures traversed by respective shafts (of tubular shape) supporting a pair of cantilevered mixing arms within the container, the shafts being journaled in ball bearings within the wall apertures. The container may be stationary or may be counter-rotated with reference to the mixing arms.

In such a cement mixer, or comparable equipment, the danger exists that seepage of cement slop or similar effluent from the mixing chamber may penetrate into the wall apertures and impair the operation of the shaft bearings. It has already been proposed (see German petty Pat. No. 1,994,899) to relocate the shaft bearings from the wall apertures to an external shaft mounting and to protect this mounting against seeping concrete by a cup-shaped gasket overlying the wall aperture, the interior of the gasket communicating with a source of grease under pressure which fills the clearance around the shaft within the container wall and prevents leakages as long as the necessary fluid pressure is maintained by periodic tightening of a packing gland. If, however, the pressure is ever allowed to drop below a certain threshold, cement particles can migrate through the wall aperture and travel with the lubricant into the space between the shaft and the gasket. When the machine is at standstill, the cement hardens in that space so as to scrape against the gasket when operation resumes, thereby rapidly destroying the seal.

OBJECT OF THE INVENTION

It is, therefore, the object of our invention to provide an improved shaft mounting for equipment of the aforedescribed type which obviates these disadvantages and effectively protects a shaft bearing against contamination by a liquid or solid particles in a load chamber whose wall is traversed by the substantially horizontal shaft.

SUMMARY OF THE INVENTION

This object is realized, pursuant to our present invention, by the provision of a generally cylindrical housing centered on an extremity of a substantially horizontal shaft passing through an aperture of a substantially vertical wall of a mixing chamber, this housing being axially subdivided into a first and a second cylinder. The first cylinder, close to the chamber wall, surrounds a first compartment containing a packing assembly, the second cylinder remote from that wall surrounding a second compartment containing a bearing for the shaft extremity. The packing assembly includes a rotatable section extending into the wall aperture and a nonrotatable section axially slidable in the first cylinder but substantially axially fixed with reference to the first section, the rotatable section being engaged by annular gasket means preventing migration of flowable material to the second cylinder.

According to a more particular feature of our invention, the packing assembly includes a sleeve which is fitted around the shaft for rotation therewith, this sleeve traversing the wall aperture and carrying the rotatable section. An annular end flange of the sleeve forms a stop for the rotatable section, the axial separation of the two sections from each other being maintained substantially constant by abutment means independent of the housing, more specifically by a thrust bearing resting against a shoulder on the sleeve.

According to another feature of our invention, the two cylinders are axially separated by an annular gap and are provided with respective lip seals forming part of the aforementioned gasket means, both lip seals being carried on the sleeve which extends past the gap. The lip seal in the first compartment is separated from the thrust bearing by an annular channel communicating with a source of high-pressure lubricant. High-pressure lubricant from the same or another source may also act upon a pair of deformable sealing rings respectively included in the rotatable and the nonrotatable section of the packing assembly, these rings having edges held in contact with each other by the lubricant pressure. The space accommodating the sealing rings forms part of an annular passage which extends around the rotatable section and, advantageously, includes two axially spaced annular lip seals, the lip seal closer to the lubricant inlet being of substantially L-shaped cross-section facing away from that inlet to facilitate penetration of lubricant into the space between the two lip seals.

The various seals forming part of the gasket means of the packing assembly, disposed at axially and radially spaced locations, effectively prevent the migration of cement slop or other flowable material to the region of the second cylinder containing the journal bearing for the shaft. The axial mobility of the nonrotatable section of the packing assembly, relative to the surrounding first cylinder resting against the chamber wall, allows a certain deformation of that wall during operation without subjecting the shaft bearing to objectionable stresses, thanks to the axial gap separating the two cylinders of the housing from each other. The provision of a flanged sleeve enables the packing assembly to be installed as a unit and removed in one piece for replacement or repair.

BRIEF DESCRIPTION OF THE DRAWING

The above and other features of our invention will now be described in detail with reference to the accompanying drawing the sole FIGURE of which is a perspective view, with parts broken away, of our improved shaft mounting for a cement mixer.

SPECIFIC DESCRIPTION

In the drawing we have shown an end wall 1 of a mixing chamber or drum 2 in which one or more stirrer arms 50 are mounted in cantilever fashion on a shaft 3 for rotation about a horizontal axis O, this shaft traversing an aperture 51 in wall 1. An extremity 31 of the shaft, provided with a pulley 52 for rotary entrainment by a nonillustrated drive belt, is journaled in a roller bearing 20 within a unitary housing 4 of generally cylindrical configuration divided into two axially spaced cylinders 41 and 42, these cylinders being axially separated by an intervening gap 5. Cylinder 41 defines a first compartment containing a packing assembly I; cylinder 42 defines a second compartment accommodating a bearing unit which includes a pair of lip seals 21, 22 flanking the journal bearing 20.

Packing asembly I comprises a sleeve 6, firmly hugging the shaft extremity 31, which passes through the aperture 51 and has an end flange 7 lying within chamber 2. Assembly I is axially subdivided into a rotatable section 53, resting against flange 7, and a nonrotatable section 14 which is axially slidable along an inner peripheral surface 19 of cylinder 41. A refractory shell 8 of section 53 is engaged by a pair of axially spaced annular lip seals 9 and 10, seal 10 having an L-shaped cross-section facing away from an inlet 54 for high-pressure lubricant admitted via a conduit 12 from a nonillustrated pump into an annular passage 11 surrounding the section 53. Pressure of that lubricant also acts upon a pair of deformable sealing rings 55, 13 (e.g. of Teflon) which are respectively secured by elastic rings 13', 55' to sections 53 and 14 for relative rotation, these sealing rings having peripheral edges in contact with each other. The relative separation of sections 53 and 14 is substantially invariable, being determined by an abutment 56 in the form of a split ring carried on sleeve 6 and holding in position a thrust bearing 15 engaging the section 14. Lubricant pressure also acts axially upon the thrust bearing 15 via a channel 57, connected to the lubricant pump through a conduit 17, which separates the thrust bearing from a lip seal 16 on the load side of the gap 5. Cylinder 41 can thus limitedly shift axially, with reference to nonrotatable assembly section 14, in response to elastic deformations of chamber wall 1 without affecting the journal bearing 20 in cylinder 42, the two cylinders 41 and 42 being interconnected by yieldable bridge portions 58 of the housing 4. These bridge portions allow visual inspection of the gap 5 from above, thus enabling an operator to ascertain whether cement from chamber 2 has somehow penetrated into that gap. In such an event, pulley 52 and an end disk 59 bolted onto shaft extremity 31 can be removed to facilitate disassembly and extraction of unit I on sleeve 6.

We have found that the construction herein disclosed insures satisfactory operation of shaft 3 even if the mixing chamber 2 is filled with cement well above the level of axis 0 and in the presence of solids of small particle size as well as with a high water content.

We claim:

1. In machinery including a mixing chamber for flowable material and a stirrer therefor in said chamber rotatable about a substantially horizontal axis, in combination:

a substantially vertical chamber wall provided with an aperture;

a substantially horizontal shaft connected to the stirrer and provided with an extremity passing through said aperture;

a generally cylindrical housing centered on said extremity and secured to said wall, said housing being axially subdivided into a first cylinder close to said wall surrounding a first compartment and a second cylinder remote from said wall surrounding a second compartment;

a packing assembly in said first compartment including a rotatable section extending into said aperture and a nonrotatable section axially slidable in said first cylinder;

abutment means independent of said housing maintaining a substantially constant axial distance between said sections;

annular gasket means in said first cylinder engaging said rotatable section for preventing migration of flowable material via said aperture to section said second cylinder; and bearing means in said second section supporting said extremity.

2. The combination defined in claim 1 wherein said packing assembly includes a sleeve fitted around said shaft for rotation therewith, said sleeve traversing said aperture and carrying said rotatable section.

3. The combination defined in claim 2 wherein said sleeve is provided with an annular end flange forming a stop for said rotatable section.

4. The combination defined in claim 3 wherein said abutment means comprises a shoulder on said sleeve and a thrust bearing between said shoulder and said nonrotatable section.

5. The combination defined in claim 4 wherein said first and second cylinders are axially separated by an annular gap and are provided with respective first and second lip seals forming part of said gasket means and flanking said gap, said sleeve extending past said gap and being engaged by said lip seals.

6. The combination defined in claim 5 wherein first lip seal is axially separated from said thrust bearing by an annular channel communicating with a source of high-pressure lubricant.

7. The combination defined in claim 3 wherein said rotatable section and said nonrotatable section are provided with respective deformable sealing rings with contacting edges, further comprising a source of high-pressure lubricant acting upon said sealing rings to keep said edges thereof in contact with each other.

8. The combination defined in claim 7 wherein said first cylinder forms an annular passage around said rotatable section communicating with said source, part of said gasket means being located in said passage in peripheral contact with said rotatable section.

9. The combination defined in claim 8 wherein said part of said gasket means includes two axially spaced annular lip seals.

10. The combination defined in claim 9 wherein said passage has an inlet from said source between said rotatable and nonrotatable sections, the lip seal closer to said inlet being of substantially L-shaped cross-section facing away from said inlet to facilitate penetration of lubricant into the space between said lip seals.

* * * * *